(12) United States Patent
Shiraishi et al.

(10) Patent No.: US 6,501,264 B2
(45) Date of Patent: *Dec. 31, 2002

(54) INDUCTION TYPE TRANSDUCER AND ELECTRONIC CALIPER

(75) Inventors: Yoshiaki Shiraishi, Kawasaki (JP); Kouji Sasaki, Kawasaki (JP); Masamichi Suzuki, Kawasaki (JP); Nobuyuki Hayashi, Kawasaki (JP)

(73) Assignee: Mitutoyo Corporation, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/802,845

(22) Filed: Mar. 12, 2001

(65) Prior Publication Data

US 2001/0024123 A1 Sep. 27, 2001

(30) Foreign Application Priority Data

Mar. 13, 2000 (JP) ......... 2000-068735
Mar. 13, 2000 (JP) ......... 2000-068753

(51) Int. Cl.$^7$ ............... G01B 7/14
(52) U.S. Cl. ............ 324/207.17; 324/207.24; 33/708
(58) Field of Search ........ 324/207.17, 207.24; 33/810, 819, 820, 784, 708

(56) References Cited

U.S. PATENT DOCUMENTS

| | | | | | |
|---|---|---|---|---|---|
| 2,529,561 | A | * | 11/1950 | Le Comte | 277/576 |
| 4,229,883 | A | * | 10/1980 | Kobashi | 33/784 |
| 4,384,252 | A | * | 5/1983 | Kolter | 324/239 |
| 5,102,471 | A | * | 4/1992 | Sasaki | 136/244 |
| 5,798,640 | A | * | 8/1998 | Gier et al. | 324/207.24 |
| 5,804,963 | A | | 9/1998 | Meyer | 324/207.17 |
| 5,901,458 | A | * | 5/1999 | Andermo et al. | 33/810 |
| 5,973,494 | A | * | 10/1999 | Masreliez et al. | 324/207.24 |
| 6,249,234 | B1 | * | 6/2001 | Ely et al. | 341/20 |
| 6,303,219 | B1 | * | 10/2001 | Sawamura et al. | 428/343 |
| 6,332,278 | B1 | * | 12/2001 | Bezinge et al. | 33/784 |
| 2002/0011838 | A1 | * | 1/2002 | Miyata et al. | 324/207.17 |

* cited by examiner

Primary Examiner—Edward Lefkowitz
Assistant Examiner—Darrell Kinder
(74) Attorney, Agent, or Firm—Oliff & Berridge, PLC

(57) ABSTRACT

An induction type transducer is formed at a substrate of a grid assembly which is disposed so as to be opposed to a scale. The surface of the substrate opposed to the scale is made flat, and even if a liquid enters from a gap between the grid and the scale, permeation of the liquid into the substrate is prevented.

20 Claims, 4 Drawing Sheets

INDUCTION TYPE TRANSDUCER AND ELECTRONIC CALIPER

BACKGROUND OF THE INVENTION

1. Field of Invention

The present invention relates to an induction type transducer and an electronic caliper, and in particular, an induction type transducer and an electronic caliper which are excellent in environmental durability.

2. Description of Related Art

Measuring equipment such as an electronic caliper or the like has been widely used for measuring the thickness and other physical dimensions of objects in manufacturing industries. As a main component of an electronic caliper, a transducer has been used.

Among various transducers, a capacitive coupling type transducer is generally known. In the capacitive coupling type transducer, a transmitter electrode and a reception electrode are provided on a grid (slider), and a signal electrode is provided on a scale opposed to this grid. The transmitter electrode and reception electrode on the grid are capacitively coupled with the signal electrode on the scale. A drive signal is supplied to the transmitter electrode, a detection signal generated by the reception electrode in accordance with the relative positions of the grid and scale is processed by a processing circuit, whereby the movement or position of the grid with respect to the scale is detected.

In the capacitive coupling type transducer, since it is necessary to capacitively couple the transmitter electrode and reception electrode with the signal electrode, the distance between these electrodes must be set to approximately 0.1 mm. Generally, a grid assembly is attached so as to lay across the scale in a caliper, however, in order to set the distance between the transmitter electrode and reception electrode of the grid and the signal electrode of the scale to approximately 0.1 mm as mentioned above while making smooth movements of the grid assembly and the scale possible, it becomes necessary to machine a substrate provided on the grid on which the transducer is formed.

FIG. 6 is a schematic sectional view of a related art electronic caliper using a capacitive coupling type transducer. A grid assembly 12 is attached so as to lay across a scale 10, and the grid assembly 12 slides on the scale 10 in the horizontal direction of the paper surface. The grid assembly 12 includes a substrate 14 at which the capacitive coupling type transducer is formed. The the surface of the substrate 14 is cut so as to have step 16 so that the distance between the transmitter electrode and reception electrode formed on the surface of the substrate and the signal electrode at the scale side is set to approximately 0.1 mm.

Such a capacitive coupling type transducer is suitable for use in a relatively dry and clean environment such as an inspection room or a design office. However, when such a capacitive coupling type transducer is used for dimensional measurements in an environment with a relatively high degree of pollution such as a machine shop or the like, problems arise. That is, when the transducer is used in such a polluted environment, in most cases, particulate substances or fluids such as metallic particles, polishing residue, cooling or cutting fluids exist, and if a liquid enters between the grid and scale as shown by the arrows in the figure, the liquid permeates from the step 16 of the substrate 14 into the substrate 14, damages the electrode part of the substrate and further damages the signal processing part, resulting in a detection error and measurement disablement. In addition, if metallic particles and polishing residue enter between the grid and scale, the capacitance between the signal electrode and the transmitter or reception electrode is changed, resulting in a detection error.

On the other hand, in an induction type transducer, since the relative positions are detected based on electromagnetic induction between the grid and scale, the transducer is durable for dimensional measurements in an environment with a relatively high degree of pollution.

However, even in the case where the induction type transducer is used, if a large amount of metallic particles enter between the grid and scale, the magnetic permeability between the grid and scale changes, so that the detection accuracy may lower.

SUMMARY OF THE INVENTION

Therefore, a first object of the invention is to provide an induction type transducer and an electronic caliper which are excellent in environmental durability and can be used even in an environment with a relatively high degree of pollution.

Also, a second object of the invention is to provide an electronic caliper (including equivalent measuring equipment which detects relative displacement between two members) which can detect positions with high accuracy even in an environment with a high degree of pollution regardless of the type of the transducer such as a capacitive coupling type or an induction type.

In order to achieve the first object, the induction type transducer of the invention, which outputs an electric signal in accordance with relative displacement between two members, comprises a substrate, a measuring side surface of the substrate, at which a magnetic flux generator, a magnetic flux detector, and a signal processor are formed, being made flat. The related art capacitive coupling type is not used, but the induction type transducer using magnetic induction between two members is used, whereby the coupling distance between the two members can be set to be larger than that of the capacitive coupling type. Thereby, unlike the related art example, it becomes unnecessary for the space between the members to be narrowed by providing a step at the surface of the substrate, and a liquid that has entered can be prevented from permeating into the substrate by making the surface of the substrate flat. Furthermore, in the induction type transducer, even if pollutants such as water or oil mix between the two members, the magnetic flux and magnetic non-permeability barely change, so that there is no influence on the induced voltage, and relative positions can be detected with high accuracy even in an environment with a high degree of pollution.

Herein, it is preferable that the substrate is formed by building-up a plurality of layers on a core layer. By forming the substrate of a built-up substrate, through holes penetrating the substrate are reduced, and the entrance of liquid can be more effectively prevented. It is also preferable that a sealing member is provided to seal up the surrounding of the substrate and a region at which a battery as a power supply for driving the induction type transducer is housed. The induction type transducer of the invention can be built in an electronic caliper.

Moreover, the electronic caliper of the invention, comprises a scale, a grid provided so that the grid is opposed to the scale and slidable on the scale, and a transducer for detecting relative position of the grid to the scale. In the electronic caliper, the transducer is a transducer which is magnetically coupled with the scale, and the surface of the transducer opposed to the scale is flat. By employing the magnetic coupling type, it becomes possible to set the distance between the grid and scale to be relatively wide, whereby the surface of the substrate of the grid opposed to the scale can be made flat, and even if liquids such as water, oil, or a coolant enter, its permeation into the substrate is prevented, and detection errors can be prevented.

In order to achieve the abovementioned second object, the electronic caliper of the invention comprising a scale, a grid that is opposed to the scale and slidable on the scale, and a transducer which is provided on the grid to detect the relative position of the grid to the scale, wherein wipers are provided at the end part in the sliding direction of the grid to eliminate foreign bodies on the scale. If a foreign body such as metallic particles exists on the scale, the foreign body enters inside the grid from the end part in the sliding direction of the grid, changes the physical characteristics between the transducer and scale, and lowers the detection accuracy. Therefore, by providing wipers at the end part in the sliding direction of the grid for wiping-off foreign bodies on the scale, the entrance of foreign bodies is securely prevented, and the detection accuracy can be maintained even in an environment with a high degree of pollution. In addition, since the wipers themselves slide on the scale, it is desirable that the wipers have lubricity in movement so as not to obstruct the relative movement of the grid with respect to the scale. Of course, wipers which can clean foreign bodies on the scale without being contacted with the foreign body (for example, cleaning by air blow) may be provided.

Furthermore, the electronic caliper of the invention, comprises a scale, a grid which is opposed to the scale and slidable on the scale, and a transducer which is provided on the grid to detect the relative position of the grid to the scale, wherein the surface of the scale opposed to the grid is coated with a protective film. As a protective film, by applying fluorine coating on the surface of the scale, adhesion of foreign bodies such as metallic particles onto the surface of the scale is prevented, whereby the entrance of foreign bodies between the transducer and scale can be prevented. Furthermore, by fluorine-coating, the scale surface is effectively protected from acids and alkalis, so that deterioration of the scale can also be prevented.

Furthermore, the electronic caliper of the invention comprises a scale, a grid which is opposed to the scale and slidable on the scale, and a transducer which is provided on the grid to detect the relative position of the grid to the scale, wherein wipers are provided at the end part in the sliding direction of the grid to eliminate foreign bodies on the scale, and a protective film is provided on the surface of the scale opposed to the grid. As a protective film, for example, by applying fluorine-coating on the scale surface, adhesion of metallic particles and dust is prevented, and if they adhere to the scale, they are wiped off the wipers, so that the entrance of foreign bodies between the grid and scale can be securely prevented, and the detection accuracy can be maintained. Also, the lubricity and wear resistance of the scale surface can be improved by fluorine-coating, and the operation of the wipers can be made smoother. Furthermore, by fluorine-coating, a wet-proofing property is generated so as to repel water or the like, and for example, in the case where a capacitive coupling type transducer is used, operation failure can be effectively prevented.

DETAILED DESCRIPTION OF PREFERRED EMBODIMENTS

Hereinafter, the embodiments of the invention are explained based on the drawings.

Figure 1:
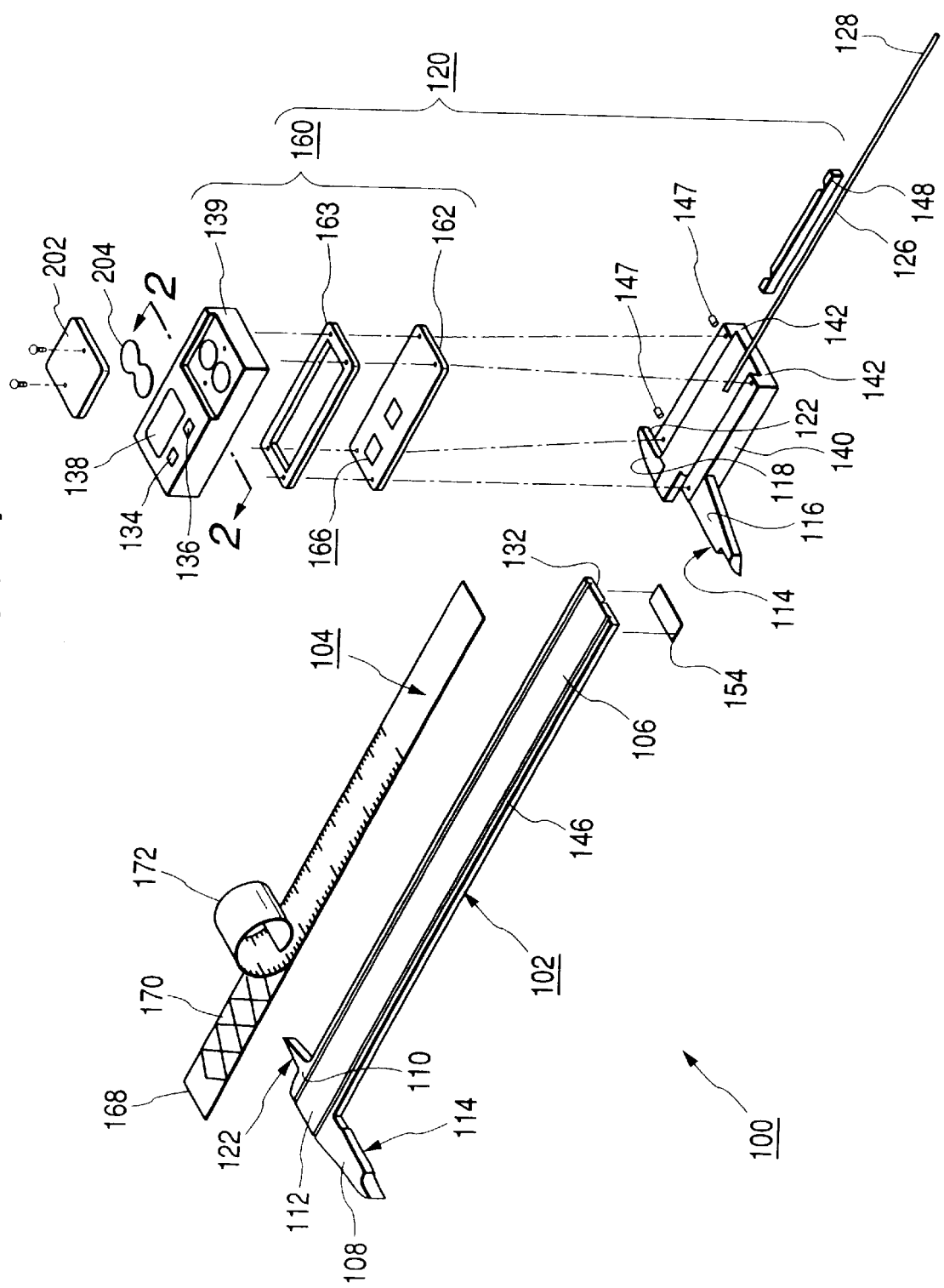
FIG. 1 is a constructional view of an electronic caliper of a first embodiment of the invention.

FIG. 1 shows the construction of an electronic caliper in which an induction type transducer is installed of the first embodiment of the invention. An electronic caliper 100 is constructed so as to include a long and thin beam 102 and a grid (slider) assembly 120. The long and thin beam 102 is a rigid or semirigid bar or plate member having an almost rectangular parallelepiped section. A groove 106 is formed in the upper surface of the long and thin beam 102. The groove 106 is formed so as to have a depth almost equal to the thickness of the scale 104, so that the upper surface of the scale 104 comes to be almost the same plane as the upper surface of the beam 102.

A pair of fixed contactors 108 and 110 which project horizontally are formed near the end part 112 of the beam 102. A pair of movable contactors 116 and 118 which project horizontally are formed on the grid assembly. The outside dimensions of an object are measured by placing it between a pair of engaging surfaces 114 of the contactors 108 and 116, and the inside dimensions of an object are measured by placing the contactors 110 and 118 inside the object. The engaging surfaces 122 of the contactors 110 and 118 are contacted with the surface of the object to be measured.

The engaging surfaces 122 and 114 are disposed so that the engaging surfaces 122 of the contactors 110 and 118 are aligned with each other when the engaging surfaces 114 of the contactors 108 and 116 are contacted with each other. This aligned position becomes a zero reference position when measuring absolute positions.

The electronic caliper 100 may be provided with a depth bar 126 to be attached to the grid assembly 120. The depth bar 126 projects lengthwise from the beam 102 and ends at the engaging end part 128. The length of the depth bar 126 is set so that the engaging end part 128 comes to be the same plane as the end part 132 of the beam 102 when the caliper 100 is at the abovementioned zero position. In a condition where the end part 132 of the beam 102 is placed on the surface of an object having a hole made in it, the depth bar 126 is extended inside the hole until the end part 128 comes into contact with the bottom of the hole, whereby the measurement of the depth of the hole becomes possible by using the caliper 100. Of course, this depth bar 126 may not be provided.

In all cases where the outside contactors 108 and 116 are used, inside contactors 110 and 118 are used, or the depth bar 126 is used, the measured dimensions are displayed on digital display 138 attached inside cover 139 of the caliper 100. A pair of push buttons 134 and 136 are attached to the cover 139. The push button 134 is a button for turning on and off signal processing IC 166 of the grid assembly 120, and the push button 136 is a button for resetting the display 138 to zero.

The grid assembly 120 is constructed so as to include base part 40 provided with guide edges 142. The guide edges 142 come into contact with the side edges 146 of the long and thin beam 102 when the grid assembly 120 is laid across the long and thin beam 102. Thereby, it becomes possible to accurately operate the caliper 100. A pair of screws 147 press pressure bar 148 with restitutive force toward the edges which engage with the beam 102 to eliminate the "play" between the assembly 120 and the long and thin beam 102.

Furthermore, the grid assembly 120 includes detection assembly 160 attached on the base part 140 at the upper side of the long and thin beam 102. The base part 140 and the detection assembly 160 move in a united manner with respect to the scale. The detection assembly 160 includes a substrate 162, and an exciting coil, a detecting coil, and a signal processing IC are formed at the substrate 162. The exciting coil and detecting coil are formed at the surface side of the substrate 162, that is, at the side opposed to the scale 104, and the signal processing IC is formed at the back surface side of the substrate 162. A sealing member (packing) 163 with restitutive force is pushed-in between the cover 139 and substrate 162 so as to cover the surrounding of the substrate 162 and prevents the entrance of liquids into the substrate 162. In addition, by coating the cover 139, water repellency, salt resistance, water resistance, and oil resistance can be further improved.

On the other hand, the scale 104 is constructed so as to include a long and thin printed circuit board 168. A scale coil 170 is formed on the printed circuit board 168. The scale coil 170 is formed from, for example, copper. The scale coil 170 is covered by a coating layer 172, and the coating layer 172 is graduated.

In such a construction, when power is supplied to the exciting coil provided at the substrate 162, a magnetic flux is generated, and an induced current is generated in the scale coil 170 provided at the scale 104 by this magnetic flux. Then, a magnetic flux is generated by this induced current, and an induced current (induced voltage) is generated in the detecting coil provided at the substrate 162. The induced current (induced voltage) generated in the detecting coil changes in accordance with relative displacement of the exciting coil and the scale coil 170, so that the displacement is detected based on a signal from the detecting coil.

Figure 2:
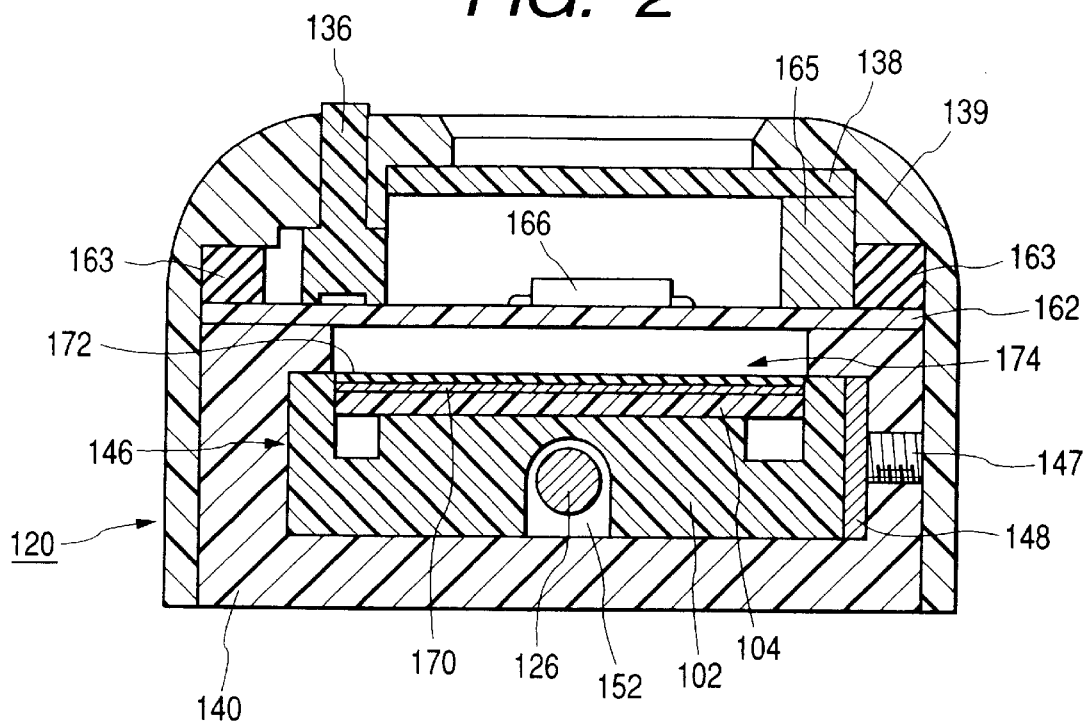
FIG. 2 is a sectional view of FIG. 1.

FIG. 2 shows a sectional view along the lines 2 to 2 in FIG. 1. In this sectional view, it is worth noting that the surface of the substrate 162 opposed to the scale 104 has no step and is made flat. Unlike the capacitive coupling type transducer, the substrate 162 of the present embodiment is an induction type transducer to be magnetically coupled with the coil at the scale 104 side, so that it becomes unnecessary for the distance between the exciting coil or detecting coil of the substrate 162 and the scale coil 170 at the scale side to be narrowed to be 0.1 mm as in the related art example. Therefore, it also becomes unnecessary to provide a step at the substrate 162, and even if a liquid enters between the grid assembly and the scale, since the surface of the substrate has been made flat, there is no fear that the liquid will permeate inside the substrate, detection errors or measurement disabled are not caused even in an environment with a high degree of pollution, and therefore, detection can be stably made.

In addition, the substrate is preferably a built-up substrate formed by laminating layers in order on both surfaces of the core layer. In the built-up substrate, through holes in the substrate can be suppressed, so that the entrance of liquids into the substrate can be efficiently prevented. It is also preferable that unnecessary through holes are filled with, for example, a resin.

Figure 3:
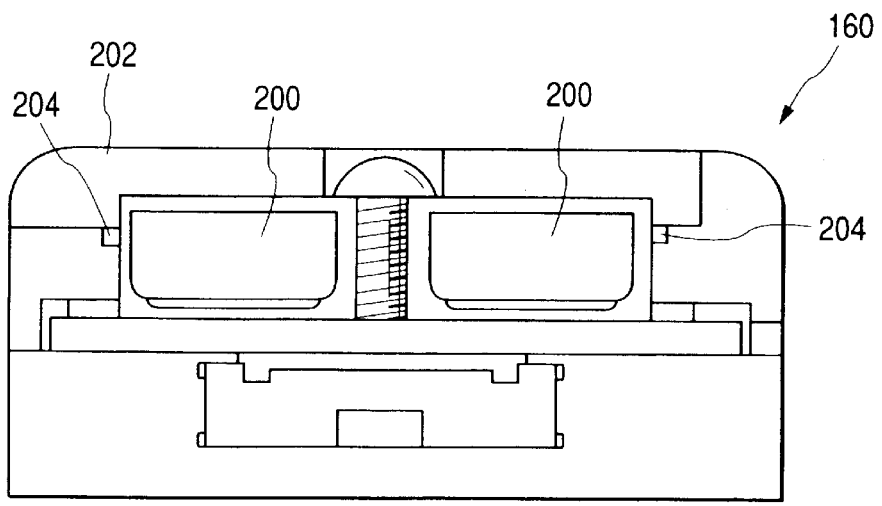
FIG. 3 is an explanatory view of a power supply unit of the first embodiment of the invention.

Furthermore, FIG. 3 shows the construction of a transducer drive power supply unit in the detection assembly 160. As a power supply, a plurality (two in the figure) of batteries 200 are housed within a predetermined region on the substrate 162. A ring-shaped packing 204 is disposed around the batteries 100, and a battery cover 202 is fastened by a screw, whereby the packing 204 is pressurized and the batteries 200 can be sealed up from the outside. By sealing the surrounding of the substrate 162 by the sealing member 163, and by also sealing the battery portion by the packing 204, operation of the electronic caliper which is independent from the surrounding environment can be secured.

As described above, according to the induction type transducer and electronic caliper of the invention, relative displacement can be securely detected even in an environment with a relatively high degree of pollution.

Next, the electronic caliper of the second embodiment of the invention having the induction type transducer is installed inside is explained.

Figure 4:
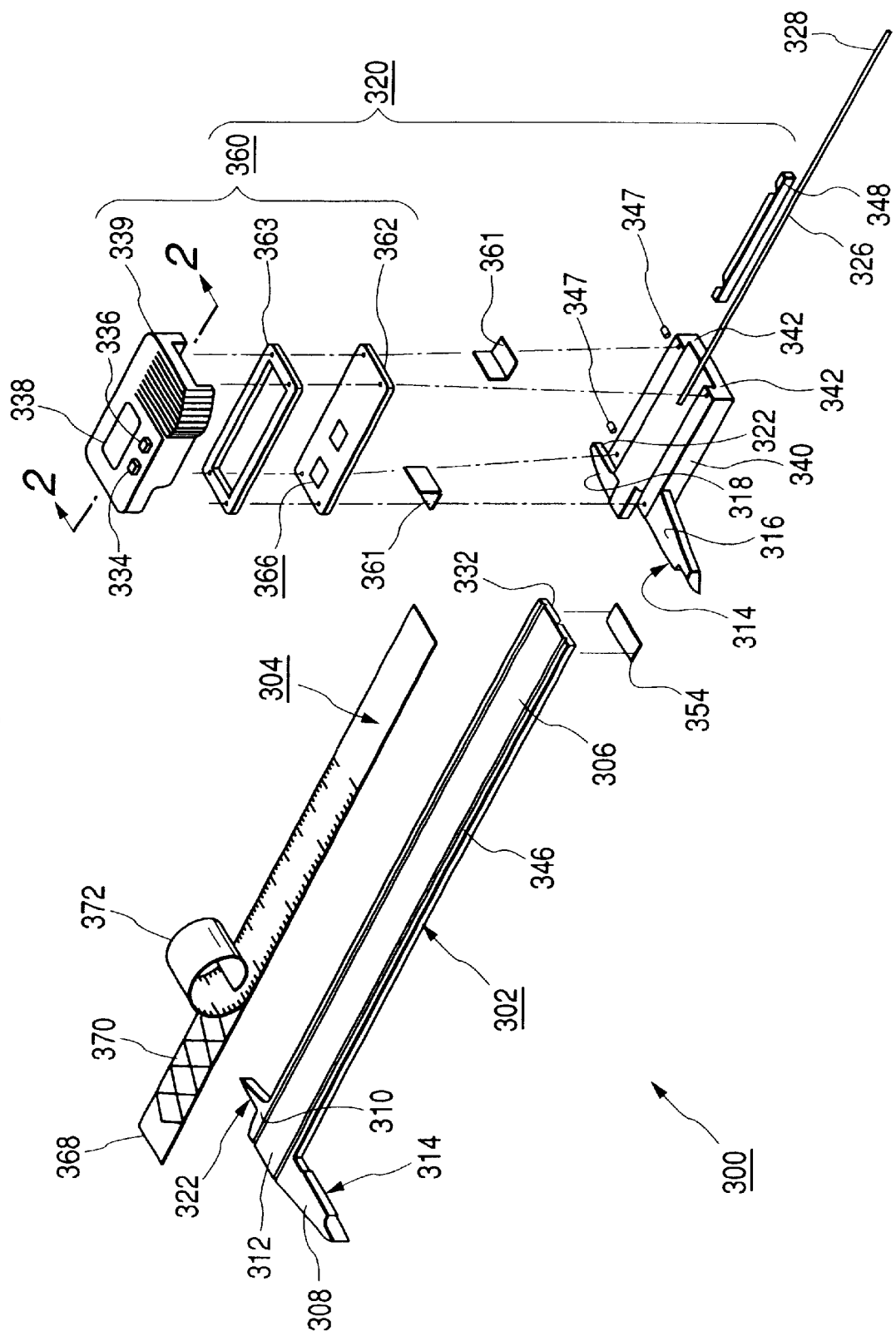
FIG. 4 is a constructional view of an electronic caliper of a second embodiment of the invention.

FIG. 4 shows the construction of the electronic caliper having of the second embodiment of the invention the induction type transducer installed inside.

An electronic caliper 300 is constructed so as to include a long and thin beam 302 and a grid (slider) assembly 320. The long and thin beam 302 is a rigid or semirigid bar or plate member having a roughly rectangular parallelepiped section. A groove 306 is formed in the upper surface of the long and thin beam 302. A measuring scale 304 is fixed inside the groove 306 of the long and thin beam 302. The groove 306 is formed so as to have a depth that is almost equal to the thickness of the scale 304, and therefore, the upper surface of the scale 304 comes to be almost the same plane as the upper surface of the beam 302.

A pair of fixed contactors 308 and 310 that project horizontally are formed near the end part 312 of the beam 302. Furthermore, in the grid assembly 320, a pair of corresponding movable contactors 316 and 318 that project horizontally are formed. The outside dimensions of an object are measured by plating the object between a pair of engaging surfaces 314 of the contactors 308 and 316, and the inside dimensions of an object are measured by placing the contactors 310 and 318 inside the object. The engaging surfaces 322 of the contactors 310 and 318 are contacted with the surface of the object to be measured.

The engaging surfaces 322 and 314 are disposed so that the engaging surfaces 322 of the contactors 310 and 318 are aligned with each other when the engaging surfaces 314 of the contactors 308 and 316 come into contact with each other. This aligned position becomes a zero reference position when measuring absolute positions.

The electronic caliper 300 may be provided with depth bar 326 to be attached to the grid assembly 320. The depth bar 326 projects lengthwise from the beam 302 and ends at the engaging end part 328. The length of the depth bar 326 is set so that the engaging end part 328 comes to be the same plane as the end part 332 of the beam 302 when the caliper 300 is at the abovementioned zero position. In the condition where the end part 332 of the beam 302 is placed on the surface of an object with a hole made in it, the depth bar 326 is extended inside the hole until the end part 328 comes into contact with the bottom of the hole, whereby the depth of the hole can be measured with the caliper 300. Of course, this depth bar 326 may not be provided.

In all cases where the outside contactors 308 and 316 are used, the inside contactors 310 and 318 are used, or the depth bar 326 is used, the measured dimensions are displayed on digital display 338 attached inside cover 339 of the caliper 300. A pair of push buttons 334 and 336 are attached to the cover 339. The push button 334 is a button for turning on and off signal processing IC 366 of the grid assembly 320, and the push button 336 is a button for resetting the display 338 to zero.

The grid assembly 320 is constructed so as to include a base part 340 provided with guide edges 342. The guide edges 342 come into contact with the side edges 346 of the long and thin beam 302 when the grid assembly 320 is laid across the long and thin beam 302. Thereby, the caliper 300 can be accurately operated. A pair of screws 347 press pressure bar 348 with restitutive force toward the edge part that engages with the beam 302 and eliminate the "play" between the assembly 320 and long and thin beam 302.

Furthermore, the grid assembly 320 includes a detection assembly 360 attached on the base part 340 at the upper side of the long and thin beam 302. The base part 340 and detection assembly 360 move in a united manner with respect to the scale. The detection assembly 360 includes a substrate 362, and an exciting coil, detecting coil, and signal processing IC are formed at the substrate 362. The exciting coil and detecting coil may be formed at the surface side of the substrate 362, that is, at the side opposed to the scale 304, and the signal processing IC may be formed at the back surface side of the substrate 362. A sealing member (packing) 363 with restitutive force is pushed-in between the cover 339 and substrate 362 so as to cover the surrounding of the substrate 362 to prevent the entrance of liquids into the substrate 362. In addition, by coating the cover 339, water repellency, salt resistance, water resistance, and oil resistance can be further improved.

Furthermore, wipers 361 are provided at the end part in the sliding direction of the grid assembly 320. The wipers 361 have been bent into rough L shapes, and one end of the wiper is attached inside the cover 339, and the other end is an open end, and the wipers slide on the surface of the scale 304 when the grid assembly 320 slides on the scale 304. The positions at which the wipers 361 are disposed are further described later.

On the other hand, the scale 304 is constructed so as to include a long and thin printed circuit board 368. A scale coil 370 is formed on the printed circuit board 368. The scale coil 370 is formed from, for example, copper. The scale coil 370 is coated with plastic film layer 372, and the film layer 372 is graduated. A colorless transparent fluorine-coating is applied on the film layer 372, whereby adhesion of metallic particles and duct onto the surface of the scale 304 is effectively prevented. The plastic film layer 372 may be a glass epoxy layer.

In such a construction, when power is supplied to the exciting coil provided at the substrate 362, a magnetic flux is generated, and an induced current is generated in the scale coil 370 provided at the scale 307 by this magnetic flux. Then, a magnetic flux is generated by this induced current, and an induced current (induced voltage) is generated in the detecting coil provided at the substrate 362. The induced current (induced voltage) generated in the detecting coil changes in accordance with relative displacement of the exciting coil and scale coil 370, so that the displacement is detected based on a signal from the detecting coil.

Figure 5:
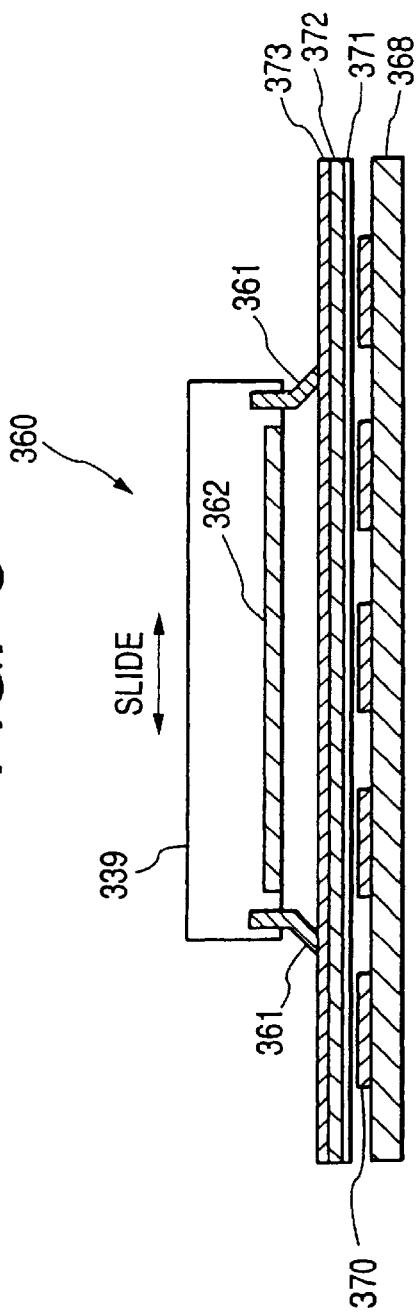
FIG. 5 is a sectional view of the main part of FIG. 4.
Figure 6:
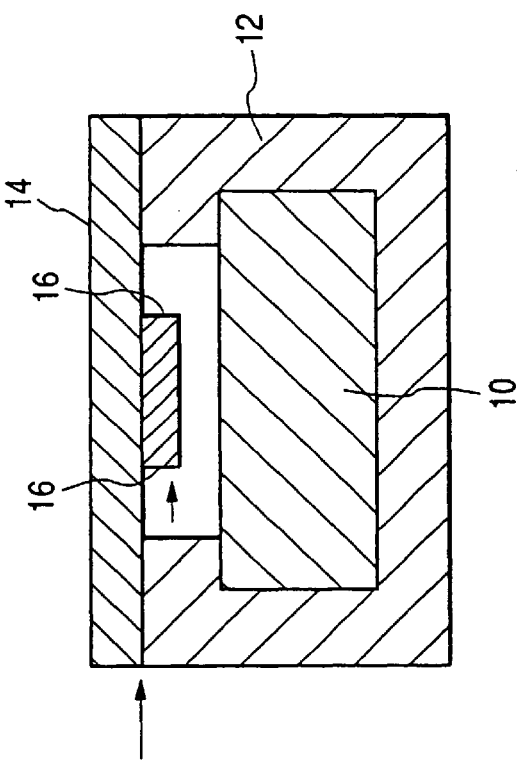
FIG. 6 is a sectional view of equipment in related art.

FIG. 5 shows the main part of the sectional view along the lines 2 to 2 in FIG. 4. Wipers 361 are provided at the end part of the sliding surface of the detection assembly 360 comprising the grid assembly 320, more specifically, at the opening end of the sliding surface side of the cover 339. The substrate 362 is sealed and housed within the grid assembly 320 by the cover 339 and the wipers 361. When the grid assembly 320 slides, the free end of the wiper 361 wipes off the surface of the scale 304. The wiper 361 may be formed from, for example, NBR (nitryl buthyl rubber) or fluororubber. Since the NBR has oil resistance, it prevents deterioration of swelling due to oil, and since the NBR has high wear resistance, it can maintain the wiper effect for a long period of time. The fluororubber has non-adhesiveness and lubricity, so that polluted particulate substances can be prevented from entering a gap between the grid assembly 320 and scale 304 or between the substrate 362 and scale 304 by a combination with the fluororubber and the cover 339 without deteriorating the sliding performance of the grid assembly 320. In addition, since the fluororubber has wear resistance and chemical resistance, so that the rubber can be used in various environments.

The film 372 that has the fluorine coating layer 373 as mentioned above is adhered to the surface of the scale 304 with an adhesive tape. By applying fluorine coating, even a substance with high adhesiveness adheres to the surface of the scale 304 only with difficulty, and if such a substance adheres to the surface, it is easily removed. Therefore, by a synergistic effect with the wipers 361, a clean condition of the surface of the scale 304 can be maintained. Furthermore, by applying fluorine coating, lubricity and wear resistance are provided, so that the wipers 361 can be made to more smoothly slide on the surface. In addition, due to corrosion resistance and weather resistance, the scale body can be effectively protected from acids, alkalis, salts, and oils and fats.

Furthermore, in the present embodiment, an electronic caliper using an induction type transducer is explained, however, the invention can be applied to an electronic caliper using the capacitive coupling type or other type of transducer in the same manner.

Likewise, the invention can be applied to equipment which is technologically equivalent to an electronic caliper, that is, measuring equipment (for example, a height gauge or the like) for detecting relative displacement between two members by using a transducer.

In addition, when the induction type transducer relating to the first embodiment of the invention, that is, an induction transducer whose surface opposed to the scale is flat is used, there is no fear that liquid will enter inside the substrate even when the liquid has entered between the grid and the scale, so that more stable detection becomes possible.

As described above, by the electronic caliper of the invention, detection is securely made even in an environment with a high degree of pollution.

What is claimed is:

1. An induction type transducer comprising:
   a substrate having a uniformly flat surface at the measuring side;
   a magnetic flux generator, which is formed within the uniformly flat surface of the substrate, generating a fluctuating magnetic flux;
   a magnetic flux detection part, which is formed within the uniformly flat surface of the substrate, detecting a fluctuating magnetic flux which has changed in accordance with relative displacement between two members, and outputting an electric signal in accordance with the detected fluctuating magnetic flux; and
   a signal processing part, which is formed at the substrate, detecting the relative displacement between the two members based on the electric signal.

2. The induction type transducer as set forth in claim 1, wherein the substrate is provided at one of the two members, a measuring surface of the substrate is opposed to the other member of the two members.

3. The induction type transducer as set forth in claim 2, wherein the magnetic flux generator and the magnetic flux detection part are formed at the measuring surface side of the substrate, and the signal processing part is formed at a surface of the opposite side of the measuring surface of the substrate.

4. The induction type transducer as set forth in claim 1, wherein the substrate is formed by building-up a plurality of layers on a core layer.

5. The induction type transducer as set forth in claim 1, further comprising:
   a first sealing member for sealing the surrounding of the substrate.

6. The induction type transducer as set forth in claim 1, further comprising:
   batteries, which are provided on the substrate, for driving the induction type transducer; and
   a second sealing member for sealing a region for housing the batteries.

7. An electronic caliper comprising an induction type transducer, the induction type transducer including:
   a substrate having a uniformly flat surface at a measuring side;
   a magnetic flux generator, which is formed within the uniformly flat surface of the substrate, generating a fluctuating magnetic flux;
   a magnetic flux detection part, which is formed within the uniformly flat surface of the substrate, detecting a fluctuating magnetic flux which has changed in accordance with relative displacement between two members, and outputting an electric signal in accordance with the detected fluctuating magnetic flux; and
   a signal processing part, which is formed at the substrate, detecting the relative displacement between the two members based on the electric signal.

8. An electronic caliper comprising:
   a scale;
   a grid disposed so as to be opposed to the scale, the grid being slidable on the scale; and
   a transducer, which is provide at the grid and magnetically coupled with the scale, detecting relative position of the grid to the scale, the transducer having a uniformly flat surface opposed to the scale.

9. The electronic caliper as set forth in claim 8, wherein the transducer comprises:
   a substrate, which is provided on the grid, having a uniformly flat surface opposed to the scale;
   a magnetic flux generator, which is formed within the uniformly flat surface of the substrate, generating a fluctuating magnetic flux;
   a magnetic flux detection part, which is formed within the uniformly flat surface of the substrate, detecting a fluctuating magnetic flux which has changed in accordance with the relative position of the grid to the scale, and outputting an electric signal in accordance with the detected fluctuating magnetic flux; and
   a signal processing part, which is formed at the substrate, detecting the relative position of the grid to the scale based on the electric signal.

10. The electronic caliper as set forth in claim 9, wherein the substrate is formed by building-up a plurality of layers on a core layer.

11. An electronic caliper comprising:
   a scale;
   a grid disposed so as to be opposed to the scale, said grid being slidable on the scale;
   a transducer, which is provided on the grid to have a uniformly flat surface opposed to the scale, detecting relative position of the grid to the scale; and
   wipers, which are provided at least at one end part in the sliding direction of the grid, eliminating foreign bodies on the scale.

12. The electronic caliper as set forth in claim 11, further comprising:
   a protective film disposed on a surface of the scale opposed to the grid.

13. The electronic caliper as set forth in claim 12, wherein the surface of the scale opposed to the grid is coated with fluorine.

14. The electronic caliper as set forth in claim 11, wherein the wipers are formed from a NBR (nitryl buthyl rubber).

15. The electronic caliper as set forth in claim 11, wherein the wipers are formed from a fluororubber.

16. The electronic caliper as set forth in claim 11, wherein the transducer is magnetically coupled with the scale, and a surface of the transducer opposed to the scale is flat.

17. The electronic caliper as set forth in claim 11, wherein the wipers are disposed at both ends in the sliding direction of the grid.

18. An electronic caliper comprising:
   a scale;
   a grid disposed so as to be opposed to the scale, said grid being slidable on the scale;
   a transducer, which is provided on the grid to have a uniformly flat surface opposed to the scale, detecting relative position of the grid to the scale; and
   a protective film disposed on a surface of the scale opposed to the grid.

19. The electronic caliper as set forth in claim 18, wherein the surface of the scale opposed to the grid is coated with fluorine.

20. The electronic caliper as set forth in claim 18, wherein the transducer is magnetically coupled with the scale, and a surface of the transducer opposed to the scale is flat.

* * * * *